(12) United States Patent
Yoneno et al.

(10) Patent No.: US 6,657,613 B2
(45) Date of Patent: Dec. 2, 2003

(54) INPUT DEVICE USING TAPPING SOUND DETECTION

(75) Inventors: Kunio Yoneno, Shiojiri (JP); Takeshi Furihata, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 09/781,955

(22) Filed: Feb. 14, 2001

(65) Prior Publication Data

US 2001/0030640 A1 Oct. 18, 2001

(30) Foreign Application Priority Data

Feb. 17, 2000 (JP) ........................................ 2000-039524
Jun. 28, 2000 (JP) ........................................ 2000-194674

(51) Int. Cl.⁷ ............................. G09G 5/00; G09G 5/08
(52) U.S. Cl. ...................... 345/156; 345/158; 345/163
(58) Field of Search ................ 345/145, 156, 345/158, 161, 163, 173, 177, 178, 168; 178/18.01, 18.03, 18.04; 379/93.23

(56) References Cited

U.S. PATENT DOCUMENTS

| 6,028,271 | A | * | 2/2000 | Gillespie et al. | ......... 178/18.01 |
| 6,323,846 | B1 | * | 11/2001 | Westerman et al. | ......... 345/173 |
| 6,331,848 | B1 | * | 12/2001 | Stove et al. | ................. 345/156 |
| 6,335,725 | B1 | * | 1/2002 | Koh et al. | .................... 345/173 |
| 6,466,198 | B1 | * | 10/2002 | Feinstein | ..................... 345/158 |

* cited by examiner

*Primary Examiner*—Amare Mengistu
*Assistant Examiner*—Prabodh M. Dharia
(74) *Attorney, Agent, or Firm*—Oliff & Berridge, PLC

(57) ABSTRACT

An input device includes: a tapping sound detector configured to detect a tapping sound made by a user to generate a tapping sound detection signal; a converter configured to convert the tapping sound detection signal into an input operation signal; and an operation signal output device configured to output the input operation signal. The operation signal output device includes a wireless transmitter.

22 Claims, 16 Drawing Sheets

CLICK
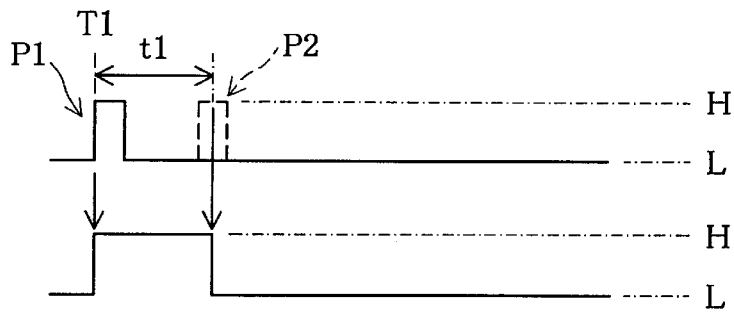
DOUBLE CLICK
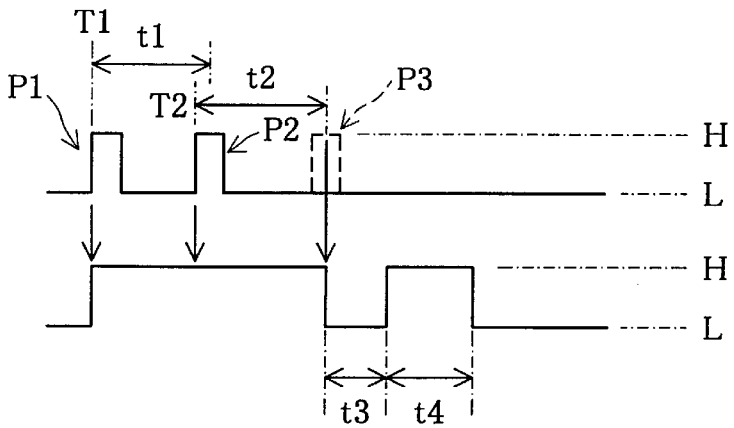
DRAGGING
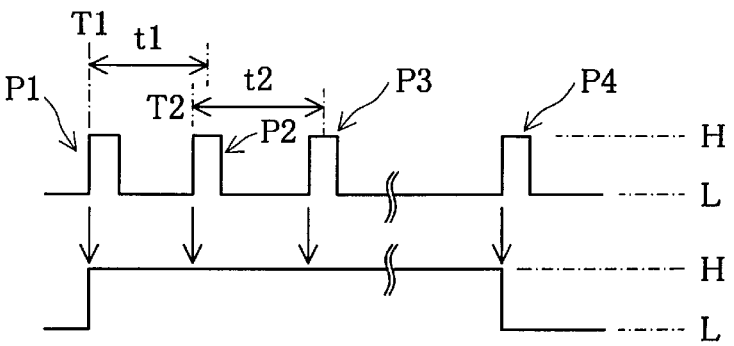

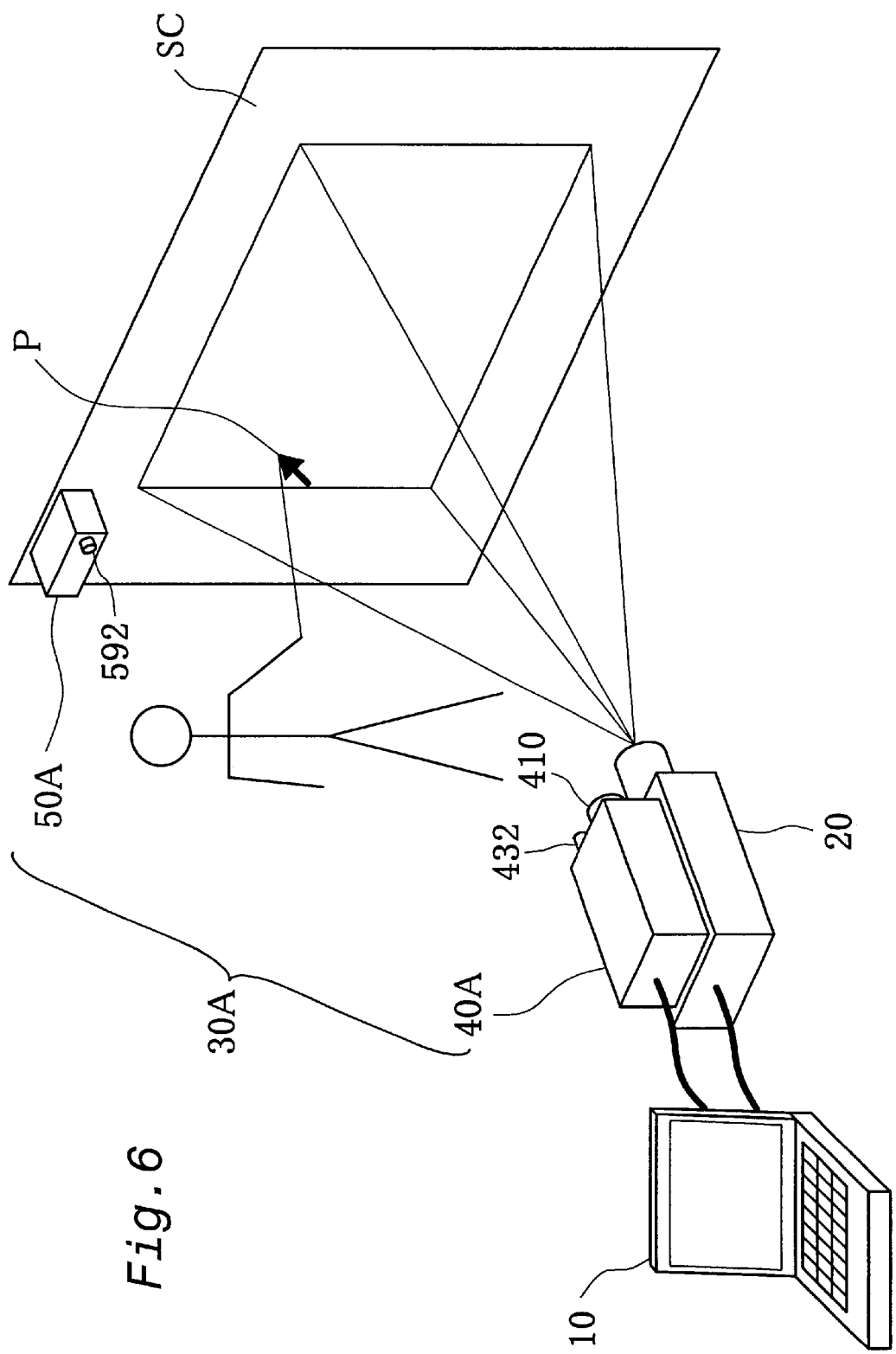

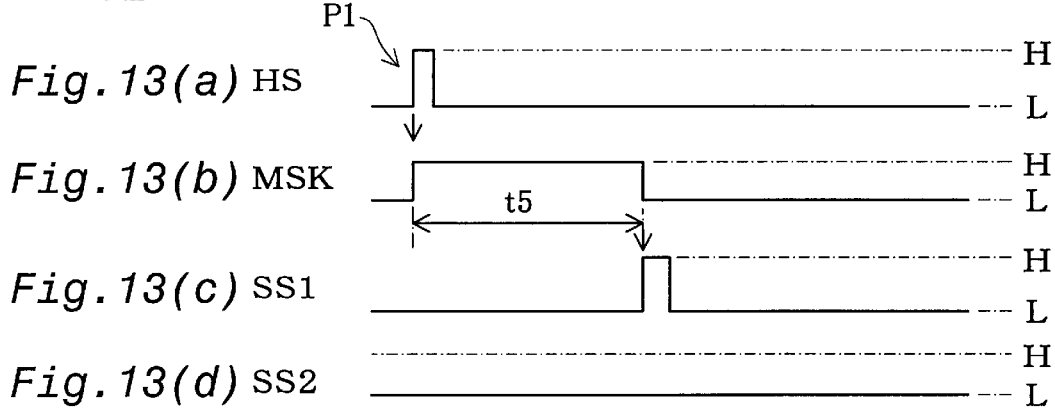
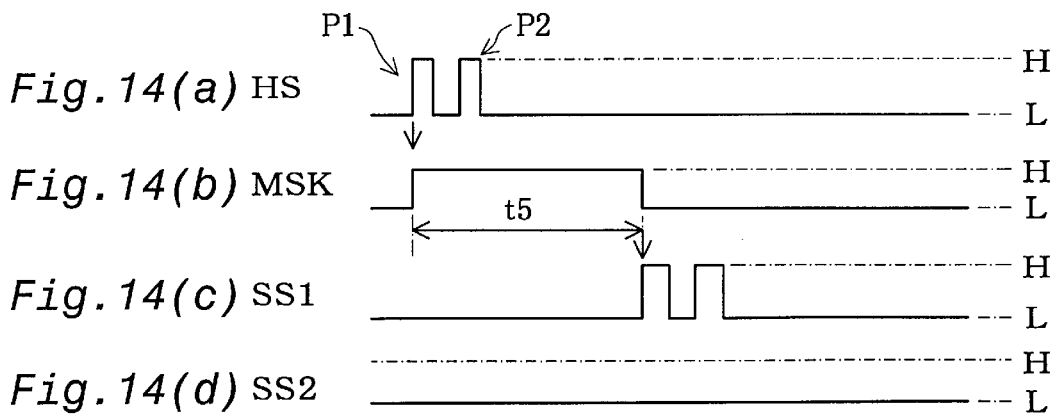

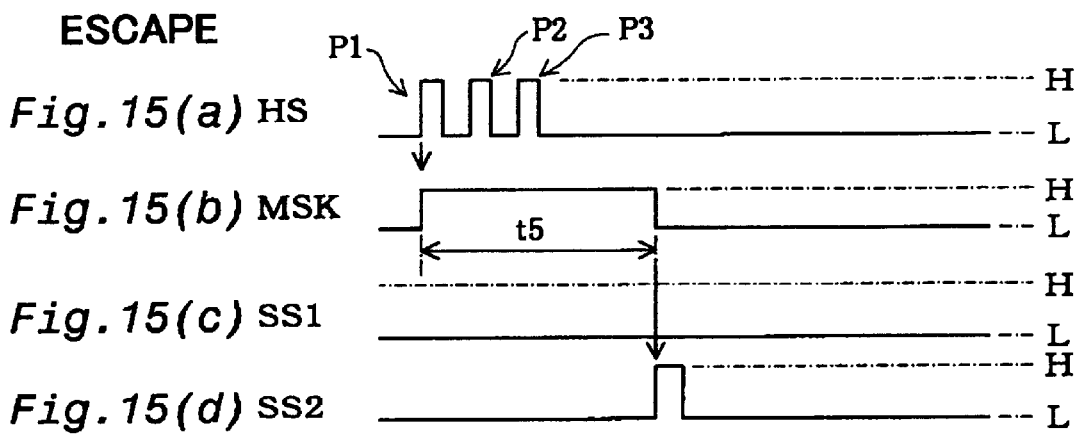
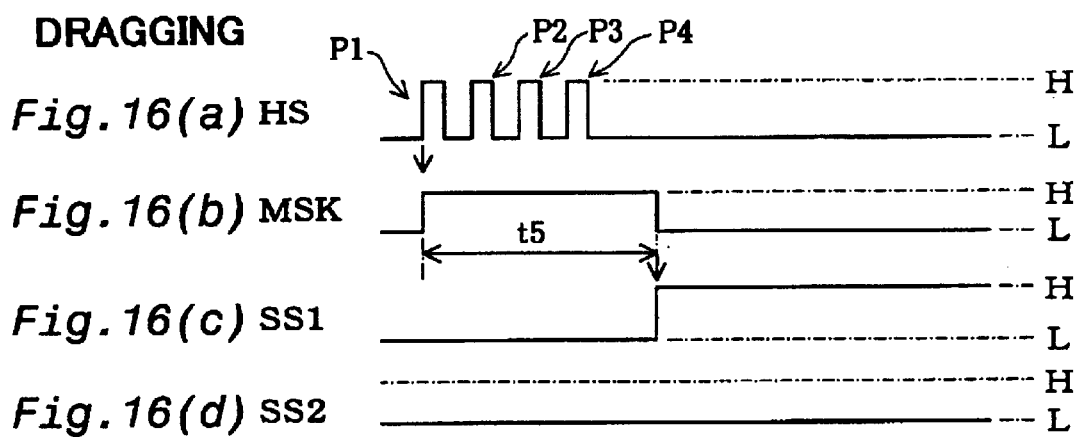

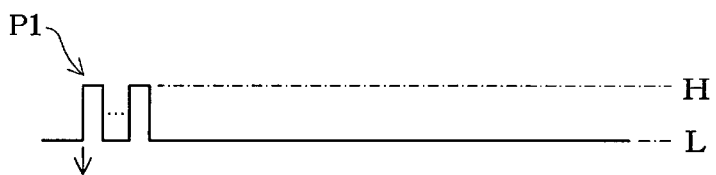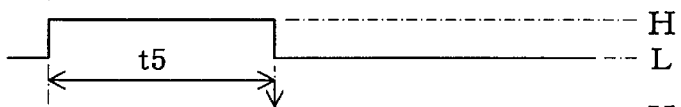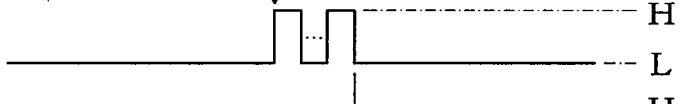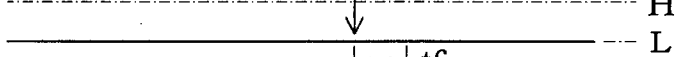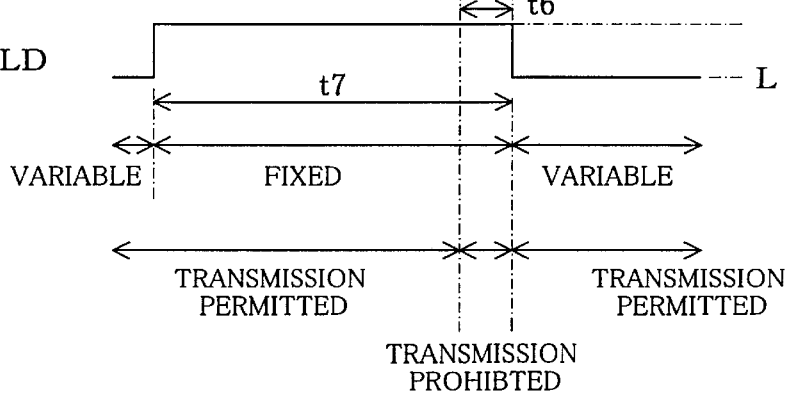

Fig. 18

| SELECTION STATUS | ICON |
|---|---|
| NON-SELECTION | A |
| CLICK | (filled) |
| DOUBLE CLICK | (flashing) |
| ESCAPE | (property display) |
| DRAGGING | A (inverted display) |

INPUT DEVICE USING TAPPING SOUND DETECTION

BACKGROUND OF THE INVENTION

1. Field of the Invention

The present invention relates to an input device that is used in an information processing device such as a computer.

2. Description of the Related Art

Projection-type display devices, or projectors, are widely used in presentation these days. When projectors project images supplied from a computer, the control of the pointer and cursor displayed on the screen is carried out using an input device such as a mouse or key board connected to the computer.

Presenters often give explanations while directly pointing to the images on the screen. Therefore, the computer operation is ordinarily performed by someone other than the presenter. The presenter orally asks for the next operation, and the operator operates the computer accordingly.

If the operation is a simple one, the above method does not entail any problems, but where a complex operation is desired, communication between the presenter and the operator sometimes does not go well. Therefore, there has been a desire on the side of the presenter that he operate the computer himself while making the presentation. However, where the computer and the screen are distanced from each other, it has been difficult for one person to operate the computer while making a presentation pointing to the images on the screen.

SUMMARY OF THE INVENTION

Accordingly, an object of the present invention is to enable the presenter to easily operate the computer while directly pointing to the images on the display screen.

In order to attain at least part of the above and other related objects of the present invention, there is provided a pointing device for supplying to a computer a pointing signal indicating a position on a display screen. The pointing device comprises: a position determination device configured to determine an indicated position on the display screen pointed with a pointing rod or fingers by a user, to thereby generate a position signal representing the indicated position; an acoustic input device configured to generate an input operation signal responsive to a sound made by the user where the input operation signal represents operations of a specific input device; and a pointing signal output device configured to supply the pointing signal including the position signal and the input operation signal to the computer.

The acoustic input device includes: a tapping sound detector configured to detect a tapping sound made by the user on the display screen to generate a tapping sound detection signal; a converter configured to convert the tapping sound detection signal into the input operation signal; and an operation signal output device configured to supply the input operation signal to the pointing signal output device.

The specific input device is preferably a mouse, and the operations represented by the input operation signal include on/off of a mouse button.

The above pointing device can generate an input operation signal that corresponds to ON/OFF of the mouse button by detecting the tapping sounds made by the user with a pointing rod or fingers, and therefore the user can easily operate the computer while directly pointing to the images on the screen The pointing rod or fingers include a pointing tool such as a pointer rod, and the hand or fingers of the presenter himself. Any means is applicable to the pointing rod or fingers as far as it points to the position that is desired to be pointed.

The operation signal output device may include a wireless transmitter.

Thus the input operation signal is transmitted from the acoustic input device to the pointing signal output device of the pointing device on a wireless basis. Consequently, the wiring between the acoustic input device and the pointing signal output device may be omitted, so that complexity of wiring and the cable becoming entangled with the presenter's leg may be avoided, and the footprint of the device may be reduced.

The acoustic input device may be located in an ineffective area of the display screen where images are not displayed, and the position determination device may be connected to the computer using a cable.

The input operation signal may include a plurality of signal patterns representing a plurality of operations of the mouse button, respectively, and the converter generates the input operation signal having one of the plurality of signal patterns according to at least one of a frequency and an interval of the tapping sounds.

For example, the plurality of operations of the mouse button include a click, a double click, and dragging, and the converter generates the input operation signal having one of the signal patterns representing the click, double click, and dragging responsive to one, two and three tapping sounds, respectively.

When receiving a new tapping sound detection signal after generation of the input operation signal representing the dragging, the converter may convert the new tapping sound detection signal into another input operation signal representing end of the dragging.

Using the above converter, the functions of the acoustic input device may be made to be equivalent to those of the mouse button.

The converter may execute: turning ON the input operation signal when a first tapping sound is detected by the tapping sound detection device; (a) when a second tapping sound is not detected within a first period of time after the detection of the first tapping sound, turning OFF the input operation signal; or (b) when the second tapping sound is detected within the first period of time, maintaining the input operation signal ON. In the last case, the converter may execute: (b1) when a third tapping sound is not detected within a second period of time after the detection of the second tapping sound, turning OFF the input operation signal, and then turning ON the input operation signal for a predetermined period of time, or (b2) when the third tapping sound is detected within the second period of time, maintaining the input operation signal ON, and then turning OFF the input operation signal when a fourth tapping sound is detected.

Using the above converter, a click, double click, drag and the end of dragging with the mouse button may be easily implemented using the acoustic input device.

'The 'ON' state of the input operation signal refers to the state in which the input operation signal becomes high level if positive logic is used, and low level if negative logic is used, while the 'OFF' state refers to the state in which the input operation signal becomes low level if positive logic is used and high level if negative logic is used.

The input operation signal may include a plurality of signal patterns representing a plurality of operations of the specific input device, respectively, and the converter may generate the input operation signal having one of the plurality of signal patterns responsive to a number of tapping sounds detected within a predetermined period of time after a first tapping sound is detected.

The specific input device may be a mouse, and the plurality of signal patterns may represent a plurality of operations of the mouse button, respectively.

The plurality of operations of the mouse button may include a click, a double click, escape and dragging, and the converter may generate the input operation signal having one of the signal patterns representing the click, double click, escape and dragging responsive to zero, one, two and three tapping sounds within the predetermined period of time, respectively.

When the converter generates the input operation signal having a signal pattern representing the dragging, the converter may further generate the input operation signal having another signal pattern representing end of the dragging when a new tapping sound is detected.

The functions of the acoustic input device are thus made to be equivalent to those of the mouse button using the above converter.

The position determining device may include: a camera configured to capture an image of an effective screen area of the display screen where images are to be displayed; and a position detector configured to detect the indicated position based on the image captured by the camera.

Using the above position determining device, the indicated position on the display screen is detected at least two-dimensionally and quickly.

The present invention is also directed to an input device for generating an input operation signal representing operations of a specific input device. The input device comprises: a tapping sound detector configured to detect a tapping sound made by a user to generate a tapping sound detection signal; a converter configured to convert the tapping sound detection signal into the input operation signal; and an operation signal output device configured to output the input operation signal.

The present invention is further directed to an image display system including an image supply device; an image display device configured to display an image represented by image information supplied from the image supply device; and the pointing device or the input device described above.

The image supply device may prohibit output of a new input operation signal from the pointing device or the input device for a predetermined period of time after receiving a previous input operation signal from the pointing device or the input device.

In this way, erroneous operations caused by sounds other than the tapping sounds may be prevented during the predetermined period of time after a previous input operation signal is received.

The image supply device may keep a position of a mark image or a pointing image displayed on the image display device for a predetermined period of time after a first tapping sound is detected by the tapping sound detector.

In this way, where the screen is made of fabric on which images are displayed via a projector, for example, the position pointed to by the user may be prevented from changing due to the vibration of the screen. In addition, it can be prevented that the indicated position changes every time a tapping sound is detected.

The image supply device may change appearance of an index image displayed on the image display device responsive to the input operation signal.

In this way, the user can easily and visually learn the state of the image supply device controlled by the pointing device or the input device.

These and other objects, features, aspects, and advantages of the present invention will become more apparent from the following detailed description of the preferred embodiments with the accompanying drawings.

BRIEF DESCRIPTION OF THE DRAWINGS

FIGS. 5(a)–5(f) are timing charts regarding the switch signal SS generated by the control circuit 560;

FIG. 6 shows the configuration of a computer system including the pointing device in a second embodiment of the present invention;

FIGS. 13(a)–13(d) are timing charts regarding the switch signal SS1 responsive to a click of the left button of a mouse;

FIGS. 14(a)–14(d) are timing charts regarding the switch signal SS1 responsive to a double click of the left button of a mouse;

FIGS. 15(a)–15(d) are timing charts regarding the switch signal SS2 responsive to a click of the right button of a mouse, i.e., an escape;

FIGS. 16(a)–16(d) are timing charts regarding the switch signal SS1 responsive to a drag by the left button of a mouse;

FIGS. 17(a)–17(e) are timing charts regarding a hold signal HLD to fix the indicated position on the display screen when tapping sounds are detected; and FIG. 18 shows one set of examples of the state of the icon on the display screen when each function of the mouse button is being executed.

DESCRIPTION OF THE PREFERRED EMBODIMENT

Figure 1:
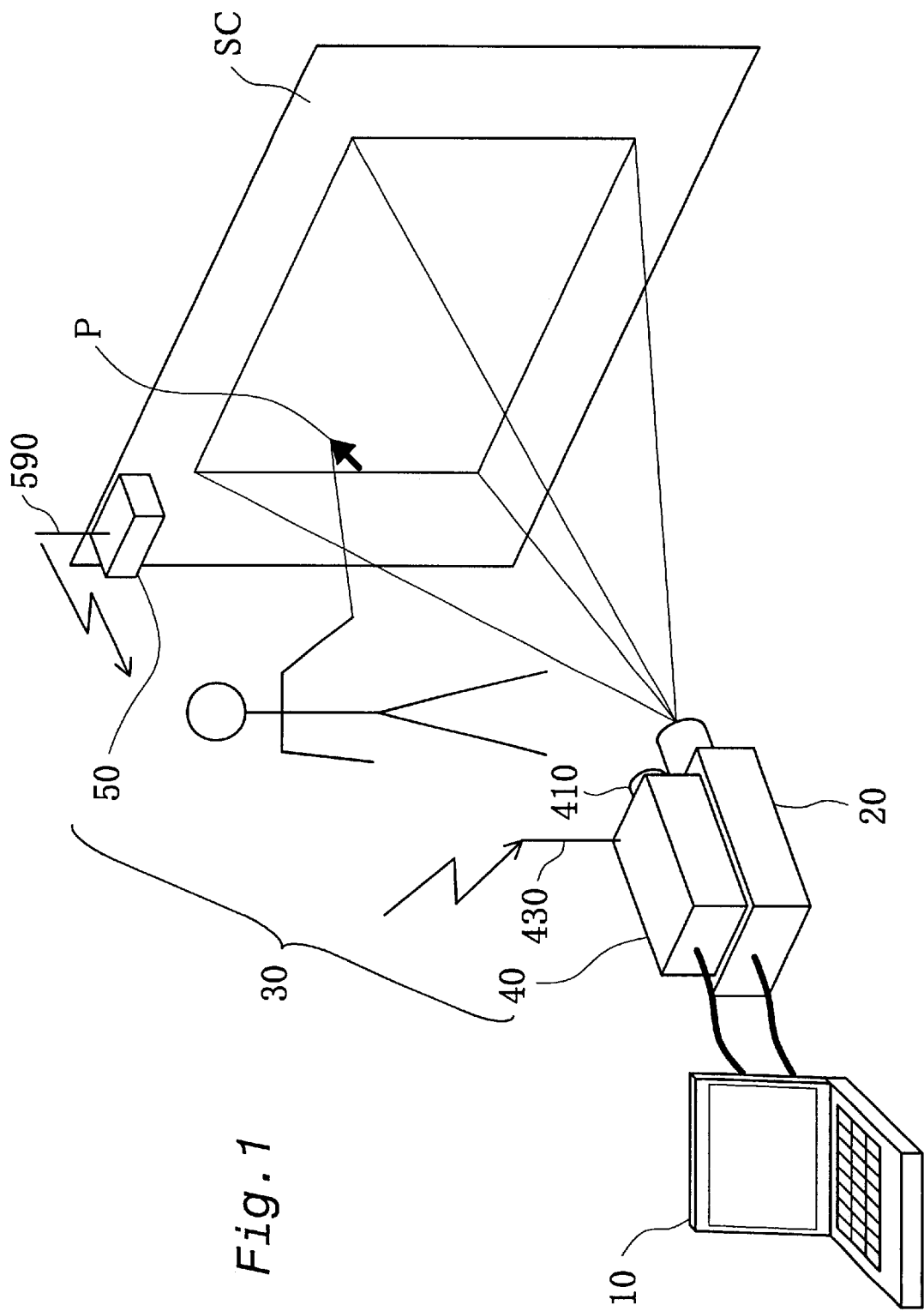
FIG. 1 shows the configuration of a computer system including the pointing device comprising a first embodiment of the present invention.

A. First Embodiment:

FIG. 1 shows the configuration of a computer system including the pointing device in a first embodiment of the present invention. The computer system includes a computer 10, which functions as an image supply device, a projector 20, which functions as a display device, and a pointing device 30. The computer system constitutes the image display system pertaining to the present invention. An image input terminal of the projector 20 is connected to an image output terminal of the computer 10 via a video cable. The projector 20 projects images supplied from the computer 10 onto the screen SC for display.

The pointing device 30 includes a pointing device signal generator 40 and a tapping sound processor 50. The pointing device signal generator 40 constitutes a position determination device and a pointing data output device of the present invention, and the tapping sound processor 50 constitutes an acoustic input device of the present invention. The tapping sound processor 50 is mounted on the projection screen SC. The tapping sound processor 50 outputs a switch signal equivalent to a signal generated by the mouse button when the presenter taps on the screen SC using a pointing rod or his/her own fingers (hereinafter referred to as 'the pointing rod or finger'), as described below. The switch signal is transmitted to the pointing device signal generator 40 via a transmission antenna 590. The tapping sound processor 50 can detect the tapping sounds made by not only the fingers that are pointing to the position where the presenter desires to point to, but also by the other fingers including those of the other hand, and by those of the hand not holding a pointing rod.

The pointing device signal generator 40 receives the switch signal via a reception antenna 430. It also seeks the coordinates of a position P on the display screen where the presenter is pointing to with the pointing rod or finger.

The pointing device signal generator 40 is connected to a mouse interface terminal, or mouse port, of the computer 10 via a signal cable. The controller 40 inputs into the computer 10 position signals representing position data of the indicated position P and the switch signal supplied from the input device. The computer 10 causes the mouse pointer or mouse cursor displayed at the position on the display screen in response to the position data represented by the position signals. The computer 10 also carries out processing in response to the switch data represented by the switch signal. The configuration and operation of the pointing device signal generator 40 and the tapping sound processor 50 are described in detail below.

Figure 2:
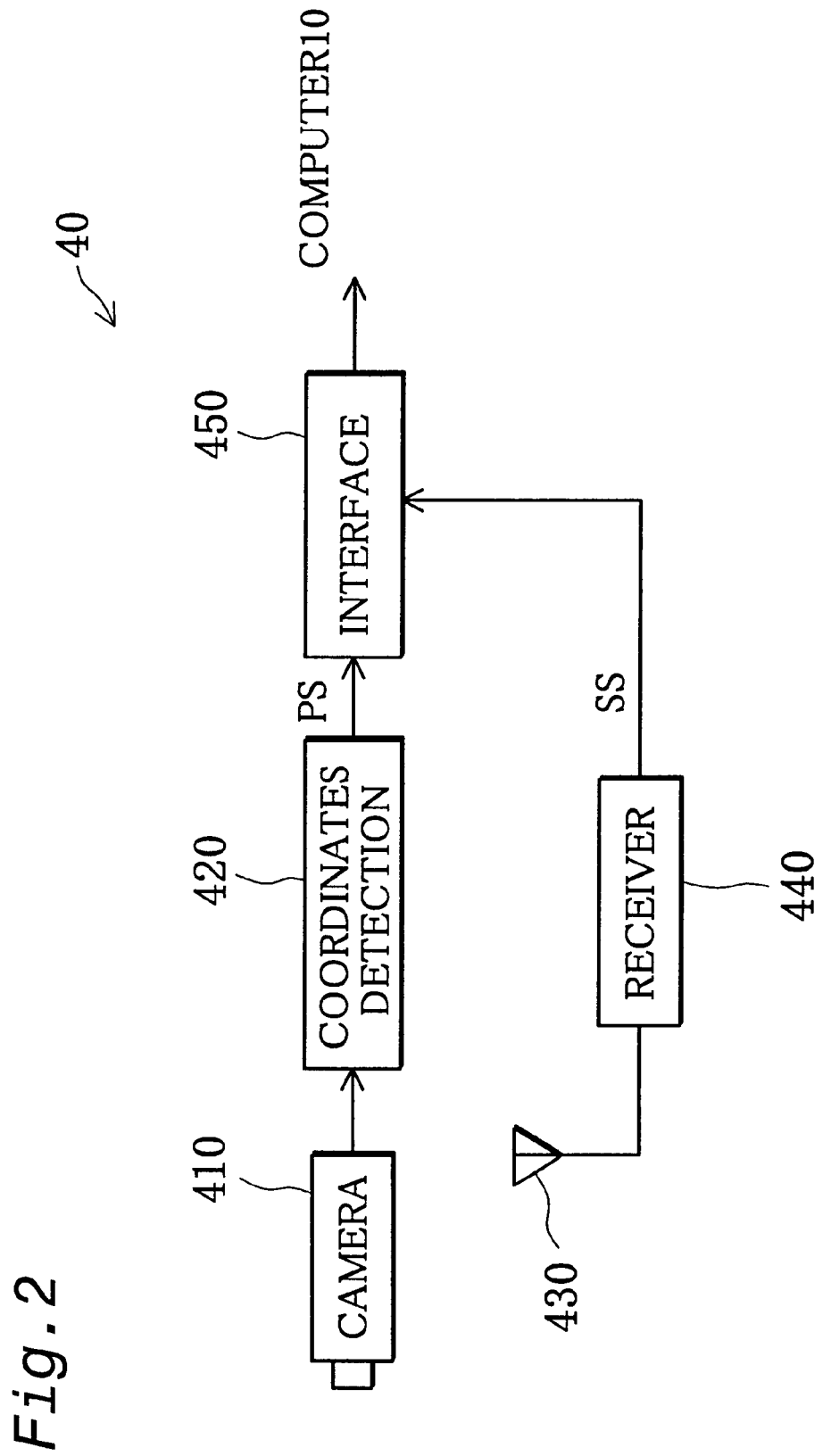
FIG. 2 is a block diagram showing the functional configuration of the pointing device signal generator 40.

A1. Configuration and Operation of Pointing Device Signal Generator 40:

FIG. 2 is a block diagram showing the functional configuration of the pointing device signal generator 40. The pointing device signal generator 40 includes a camera 410, a coordinates detection circuit 420, a reception antenna 430, a receiver 440, and an interface circuit 450. The coordinates detection circuit 420 detects the coordinates of the position P pointed to by the presenter on the display screen, based on the image of the screen SC captured by the camera 410. It is preferred that the camera 410 is placed such that it can capture the entire image displayed on the screen SC. For example, as shown in FIG. 1, the camera 410 is preferably placed on the projector 20 such that it faces the screen SC. The detection of the indicated position P by the coordinates detection circuit 420 may be implemented using any of various advanced image extraction processes generally used, such as the difference extraction method, for example. Three-dimensional positions may be sought using two cameras.

The receiver 440 receives the switch signal SS transmitted from the tapping sound processor 50 via the reception antenna 430 and outputs it to the interface circuit 450. Because the switch signal transmitted from the tapping sound processor 50 is modulated for wireless transmission, the receiver 440 includes a demodulator not shown in the drawings. The reception antenna 430 may be located on the housing of the pointing device signal generator 40, as shown in FIG. 1, or inside the housing.

The interface circuit 450 outputs the position signals PS supplied from the coordinates detection circuit 420 and the switch signal supplied from the receiver 440 in a format compatible with the interface of the computer 10.

As can be understood from the above description, the camera 410 and the coordinates detection circuit 420 constitute a position determination device of the present invention, and the reception antenna 430, the receiver 440 and the interface circuit 450 constitute a pointing data output device.

Figure 3A:
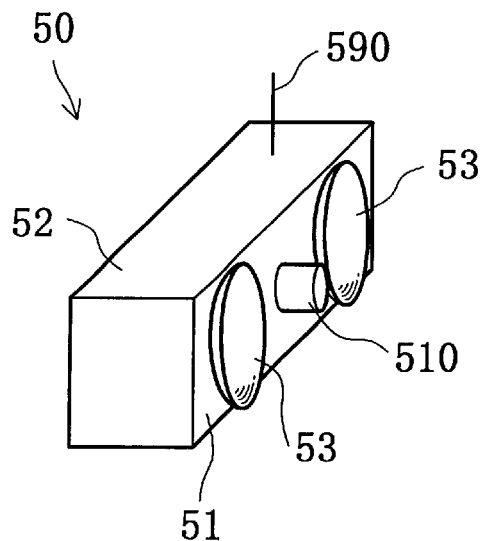
FIGS. 3(A) and 3(B) illustrate the basic configuration of the tapping sound processor 50 and how it is installed on the screen SC.
Figure 3B:
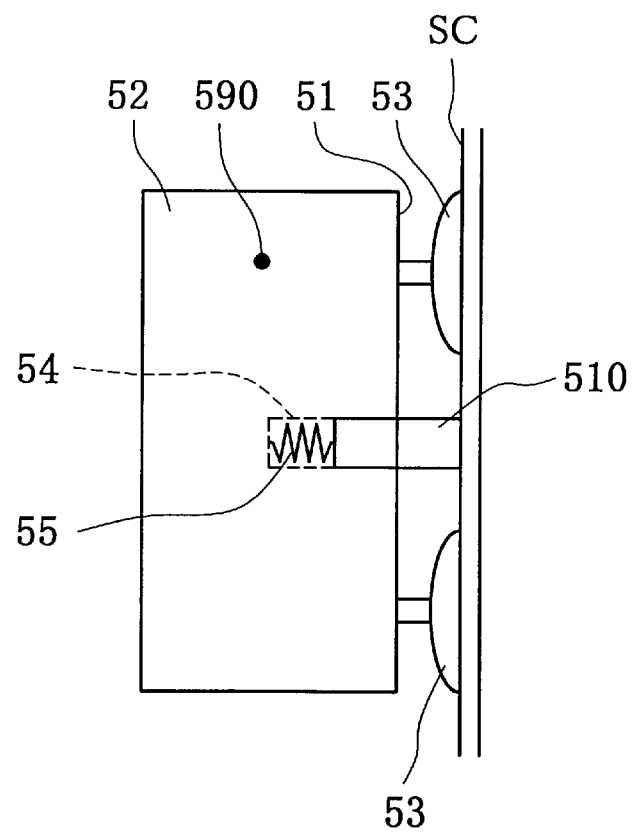

A2. Configuration and Operation of Tapping Sound Device 50:

FIGS. 3(A) and 3(B) illustrate the basic configuration of the tapping sound processor 50 and how it is installed on the screen SC. FIG. 3(A) is a basic perspective view of the tapping sound processor 50, and FIG. 3(B) is a basic plan view showing the tapping sound processor 50 installed on the screen SC. As shown in FIG. 3(A), two suction cups 53 for fixing the tapping sound processor 50 on the screen SC are located on a side surface 51 of the tapping sound processor 50 that faces the screen SC. As shown in FIG. 3(B), a microphone 510 is inserted in a groove 54 (the area shown using dotted lines) formed in the center of the side surface 51. A spring 55 is located between the bottom of the groove 54 and the microphone 510. When the tapping sound processor 50 is installed on the screen SC, the microphone 51 presses onto the screen SC. A transmission antenna 590 is located on the top surface 52 of the tapping sound processor 50. The transmission antenna 590 may be located inside the housing instead.

Figure 4:
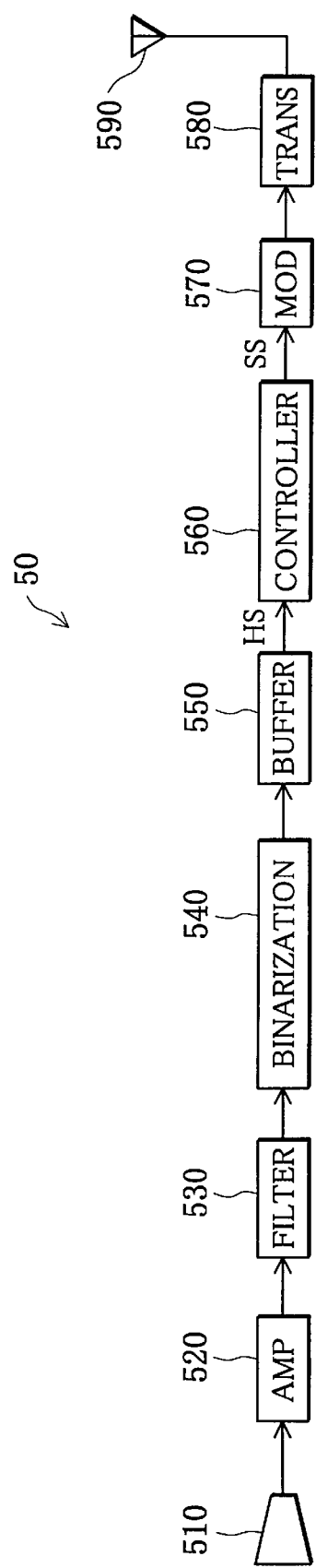
FIG. 4 is a block diagram showing the functional configuration of the tapping sound processor 50.

FIG. 4 is a block diagram showing the functional configuration of the tapping sound processor 50. The tapping sound processor 50 includes a microphone 510, an amplifier 520, a filter 530, a binarization circuit 540, a buffer 550, a control circuit 560, a modulator 570, a transmitter 580 and a transmission antenna 590. The sound detected by the microphone 510 is output as an electric signal, and after the signal is amplified by the amplifier 520 and noise is removed therefrom by the filter 530, it is input to the binarization circuit 540. The binarization circuit 540 outputs a binary tapping sound detection signal HS that represents the detection or non-detection of a taping sound to the control circuit 560 via the buffer 550. For example, in a case of positive logic, tapping sound detected is expressed by high level (H) while tapping sound not detected is expressed by low level(L). In a case of negative logic, tapping sound detected is expressed by low level(L) while tapping sound not detected is expressed by high level (H). The control circuit 560 outputs a switch signal SS responsive to the tapping sound detection signal HS.

FIGS. 5(*a*)–5(*f*) are timing charts in regard to the switch signal SS generated by the control circuit 560. FIGS. 5(*a*) and 5(*b*) show the switch signal SS corresponding to a click, FIGS. 5(*c*) and 5(*d*) show the switch signal SS corresponding to a double click, and FIGS. 5(*e*) and 5(*f*) show the switch signal SS corresponding to start and end of dragging.

When a first tapping sound is detected, a first pulse P1 is generated in a tapping sound detection signal HS, as shown in FIGS. 5(*a*) and 5(*b*). When this occurs, the switch signal SS is changed to H from L at the timing T1 where the first pulse P1 rises to H. If a second pulse P2, meaning a second tapping sound, is not generated in the tapping sound detection signal HS during a predetermined first period t1 after the timing T1, the switch signal SS falls from H to L. One pulse is generated in the switch signal SS through the above sequence. By adjusting the first period t1, one tapping sound is used to make the signal SS representing one click of the mouse button.

If a second pulse P2 is generated in response to a second tapping sound within the first period t1, the switch signal SS is maintained high, as shown in FIGS. 5(c) and 5(d). If a third pulse P3, meaning a third tapping sound, is not generated in the tapping sound detection signal HS during a second period t2 after the timing T2 where the second pulse P2 rises, the switch signal SS falls from H to L. After the switch signal SS is maintained as L for a third period t3, it rises to H again. Further, after the switch signal SS is maintained as H for a fourth period t4, it falls to L. Two pulses are generated in the switch signal SS through this sequence. By adjusting the predetermined periods t2, t3 and t4, the two tapping sounds within the first period t1 are used to make the signal SS representing a double click of the mouse button.

If a third pulse P3 is generated in response to a third tapping sound within the second period t2, the switch signal SS is maintained as H, as shown in FIGS. 5(e) and 5(f). Through this sequence, three tapping sounds within a predetermined period, for example, t1+t2, are used to make the signal SS representing the dragging with the mouse button.

Further, when a fourth pulse P4 is generated in the tapping sound detection signal HS in response to a fourth tapping sound after the third pulse P3, the switch signal SS is returned to L from H. Through this sequence, the fourth tapping sound is used to make the signal SS representing the end of the dragging via release of the mouse button.

Now, where two tapping sounds representing a double click are detected, for example, there is a situation in which the first and second positions of the screen SC that the presenter is pointing to are slightly off from each other between when the first tapping sound was detected and when the second tapping sound was detected. It is quite likely that the above positions are slightly offset when the screen SC is tapped using a pointing rod or the presenter's own fingers. In such a case, the following processing would be performed. If the offset amount is within a certain range, the tapping sounds are determined to indicate a double click. If the two positions are within an area of an icon to be selected, the tapping sounds are also determined to indicate a double click. If the tapping sounds are determined to indicate a double click in this way, any one of the two positions where the first or second tapping sound was detected may be determined to be the indicated position. Alternatively, an average of the two positions may be determined to be the indicated position. The above determination is executed by the interface circuit 450 of the pointing device signal generator 40. Alternatively, it may be carried out by the computer 10.

Where three tapping sounds indicative of dragging are detected, if the offset amounts among the three positions are within a certain range, the commencement of dragging is determined in the same way as in the case of the detection of two tapping sounds. Any one of the three positions where the first, second or third tapping sound was detected may be determined to be the indicated position. Alternatively, an average of the three positions may be determined to be the indicated position.

In the above explanation, each signal is expressed in the positive logic, but the present invention is not limited to this implementation. The negative logic may be used instead.

The switch signal SS generated by the control circuit 560 (FIG. 4) is supplied to the modulator 570 to be modulated in a format suitable for communication between the pointing device signal generator 40 and the tapping sound processor 50. It is then transmitted by the transmitter 580 via the transmission antenna 590. The transmitted switch signal SS is received by the receiver 440 via the antenna 430 (FIG. 2), as described before.

As can be seen from the above description, the microphone 510, the amplifier 520, the filter 520, the binarization circuit 540 and the buffer 550 constitute a tapping sound detection device of the present invention while the control circuit 560 constitutes a converter of the present invention. The modulator 570, the transmitter 580 and the transmission antenna 590 constitute the operation signal output device of the present invention.

The pointing device 30 of this embodiment is capable of seeking the position data that represents the position P on the display screen that is directly pointed to by the presenter using a pointing rod or finger, and inputting it to the computer 10. In addition, it can also input switch data that represent a click, double click or dragging, which are the functions of the mouse button, into the computer 10 in accordance with the number of tapping sounds that occur when the presenter taps on the screen SC. Based on these capabilities, the presenter may easily operate the computer 10 while making a presentation and pointing to the images on the screen SC.

Although the tapping sounds are made to represent a click, double click or dragging depending on the differences in the number of tapping sounds in this embodiment, the present invention is not limited to this implementation: The differences in the intervals of tapping sounds may be used instead. In other words, various differences in the tapping sounds made by the presenter on the screen may be used to make pointing device signals representing a click, double click and dragging.

Further, the control circuit 560 converts the tapping sound detection signal HS to the switch signal SS to transmit the same to the pointing device signal generator 40 in the above embodiment, but the tapping sound detection signal HS may be directly transmitted to the pointing device signal generator 40 instead. In this case, the control circuit 560 will be located between the receiver 440 of the pointing device signal generator 40 and the interface circuit 450.

B. Second Embodiment:

FIG. 6 shows the configuration of a computer system including the pointing device in a second embodiment of the present invention. The computer system has a different configuration in the pointing device 30 of the computer system of the first embodiment shown in FIG. 1, but the configuration for the other components are identical with the first embodiment and therefore will not be explained.

Figure 7:
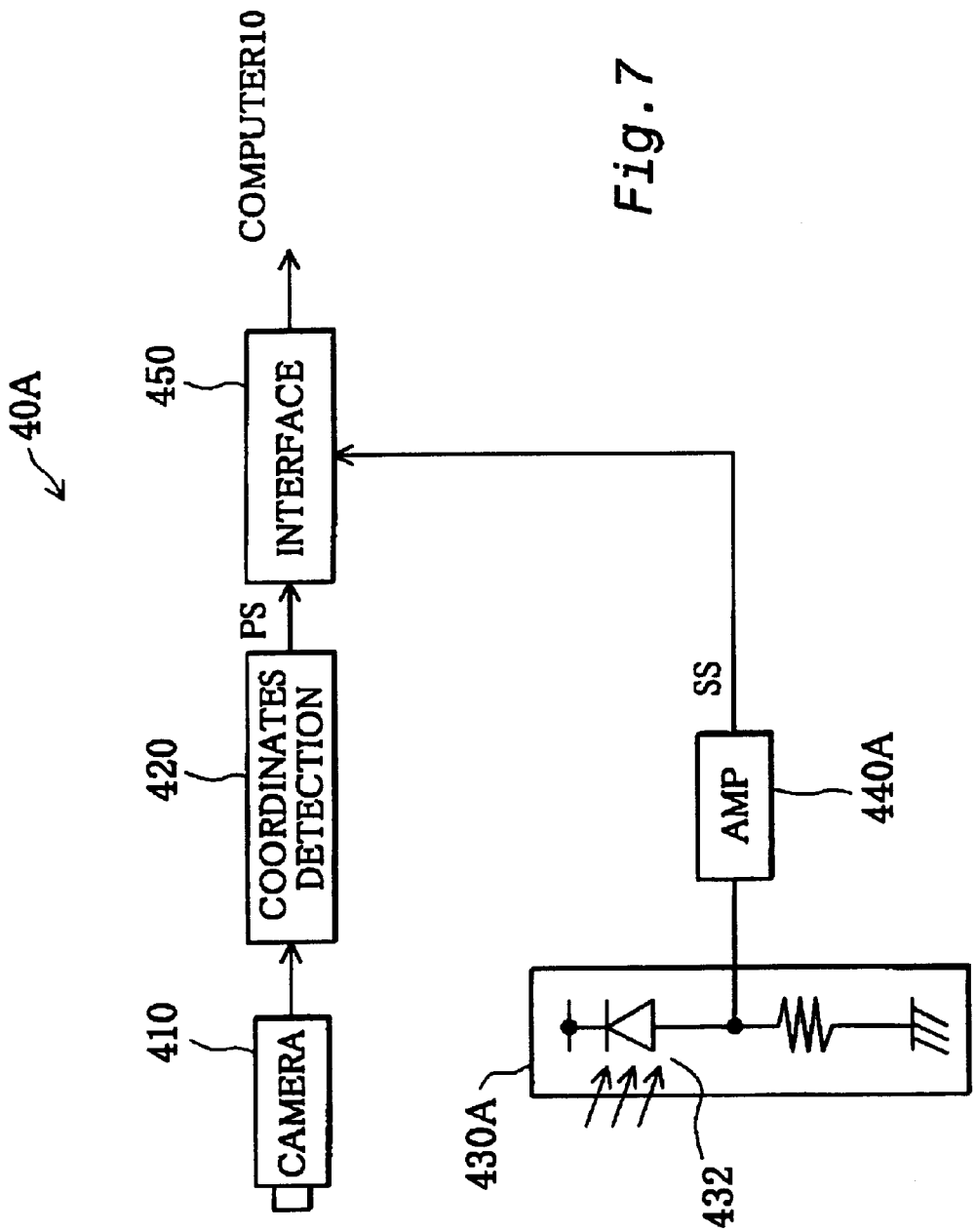
FIG. 7 is a block diagram showing the functional configuration of the pointing device signal generator 40A.
Figure 8:
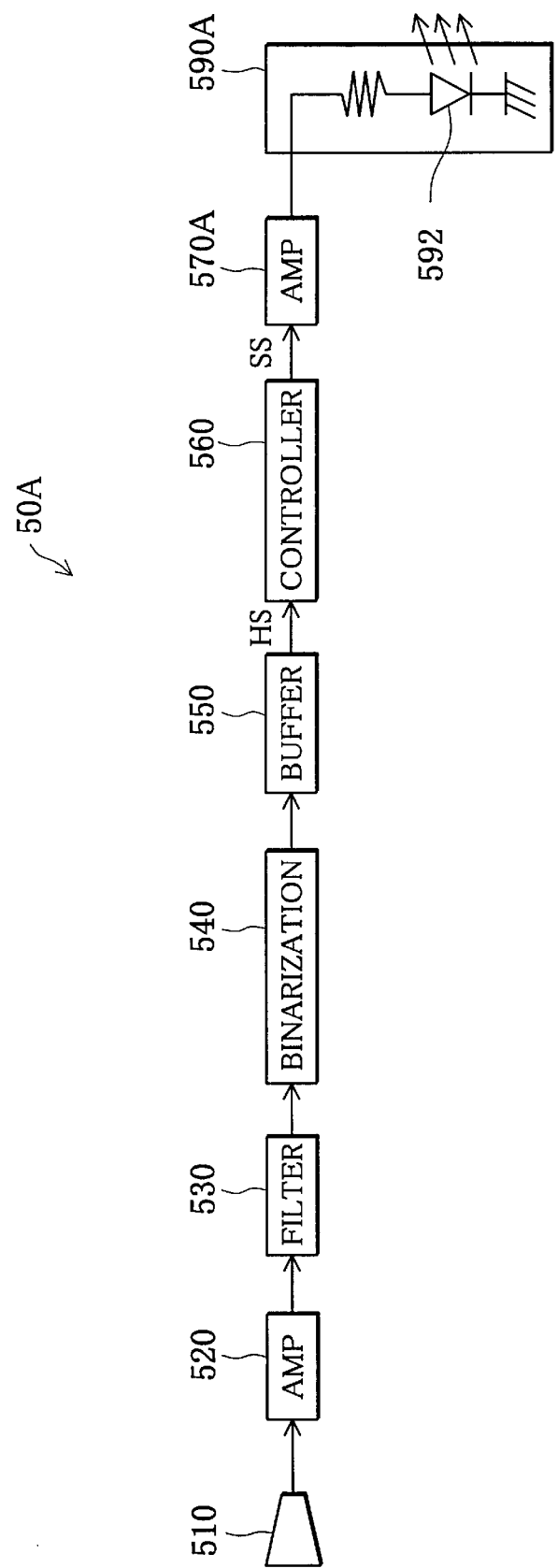
FIG. 8 is a block diagram showing the functional configuration of the tapping sound processor 50A.

The pointing device 30A includes a pointing device signal generator 40A and a tapping sound processor 50A. FIG. 7 shows the functional configuration of the pointing device signal generator 40A. FIG. 8 show the functional configuration of the tapping sound processor 50A. The pointing device signal generator 40A is the same as the pointing device signal generator 40 of the first embodiment other than that the reception antenna 430 and the receiver 440 shown in FIG. 2 are replaced with a receiver 430A and an amplifier 440A. The tapping sound processor 50A is the same as the tapping sound processor 50 of the first embodiment other than that the modulator 570 and the transmitter 580 shown in FIG. 4 are replaced with an amplifier 570A and a photo-emitter 590A.

The switch signal SS output from the control circuit 560 in FIG. 8 is amplified by the amplifier 570A, and is input to the photo-emitter 590A. The switch signal SS is modulated into a light flashing signal responsive to the signal level of the switch signal SS by the infrared light emitting diode 592 of the photo-emitter 590A. The photo-emission signal from the photo-emitter 590A is received by the infrared photodiode 432 of the receiver 430A included in the pointing device signal generator 40A shown in FIG. 7, and is converted into an electric signal. The electric signal is amplified by the amplifier 440A and is output to the interface circuit 450 as a switch signal SS. It is preferred that the infrared photodiode 432 and the infrared light emitting diode 592 are located such that they face each other in order to improve the photo-reception efficiency of the infrared photodiode 432. For example, as shown in FIG. 6, it is preferred that they are respectively located on the side surfaces of the pointing device signal generator 40A and the tapping sound processor 50A that face each other.

Using the pointing device 30A of this embodiment, switch data representing a click, double click or dragging can be input to the computer 10 in accordance with the number of tapping sounds made by the presenter on the screen SC. Based on this capability, the presenter may easily operate the computer 10 while making a presentation and pointing to the images on the screen SC.

As in the first embodiment, the tapping sound detection signal HS input to the control circuit 560 may be transmitted directly to the pointing device signal generator 50A in this embodiment as well. In this case, the control circuit 560 will be located between the amplifier 440A of the pointing device signal generator 40A and the interface circuit 450.

Figure 9A:
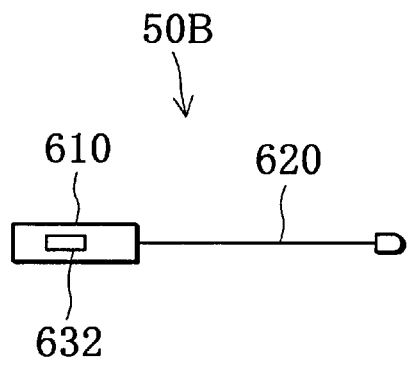
FIGS. 9(A)–9(C) illustrate various input devices.
Figure 9C:
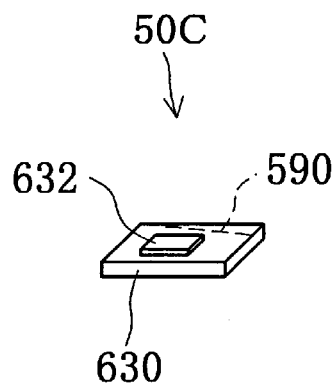
Figure 9B:
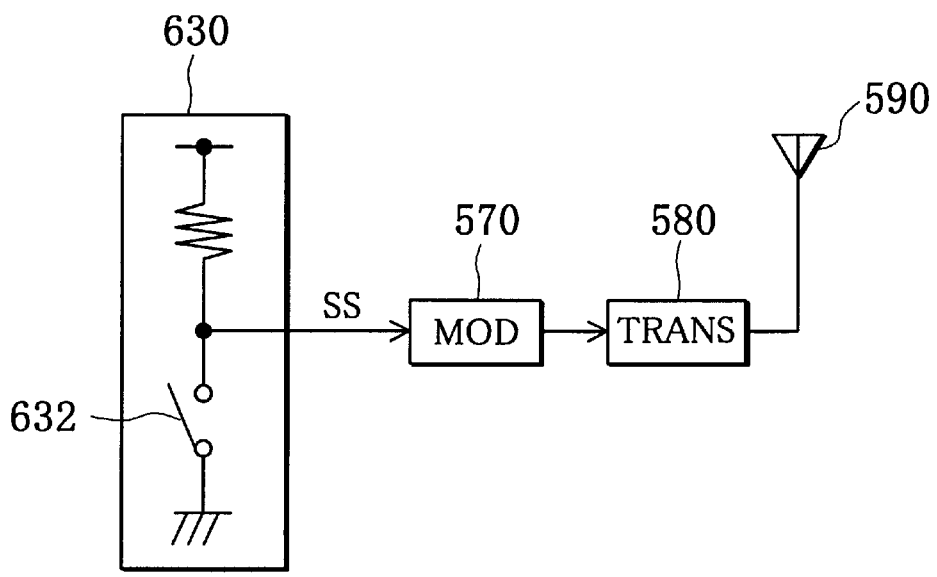

C. Other Input Devices:

The pointing device signal generator 40 described in the first embodiment may be combined with other input devices. FIGS. 9(A)–9(C) illustrate examples of such other input devices. FIG. 9(A) shows a pointing rod 50B having a grip 610 and a pointer 620. A switch button 632 is located on the grip 610. FIG. 9(B) shows the functional configuration of the pointing rod 50B, which works as an input device. When the presenter turns ON/OFF the switch button 632 while pointing to the images displayed on the screen SC using the pointing rod 50B, a switch signal SS is output from the switch unit 630 in response to the ON/OFF operation. The switch signal SS thus output is transmitted from the transmission antenna 590 via the modulator 570 and the transmitter 580 to the pointing device signal generator 40 (FIG. 1).

FIG. 9(C) shows another input device 50C that has only a built-in transmission antenna 590 and a switch unit 630. In this case, the presenter holds this input device 50C in his hand, and turns ON/OFF the switch button 632 while pointing to the images display on the screen SC using a pointing rod or his fingers. The switch signal SS is transmitted to the pointing device signal generator 40 accordingly.

While the input devices shown in FIGS. 9(A)–9(C) may be used with the pointing device signal generator 40 of the first embodiment, different input devices may be used with the pointing device of the second embodiment. For example, an input device suitable for the second embodiment may be constructed by replacing the modulator 570, the transmitter 580 and the transmission antenna 590 in FIG. 9(B) with the amplifier 570A and the photo-emitter 590A in FIG. 8 while disposing the infrared light emitting diode 592 of the photo-emitter 590A at the tip of the pointer 620 in FIG. 9(A).

Figure 10:
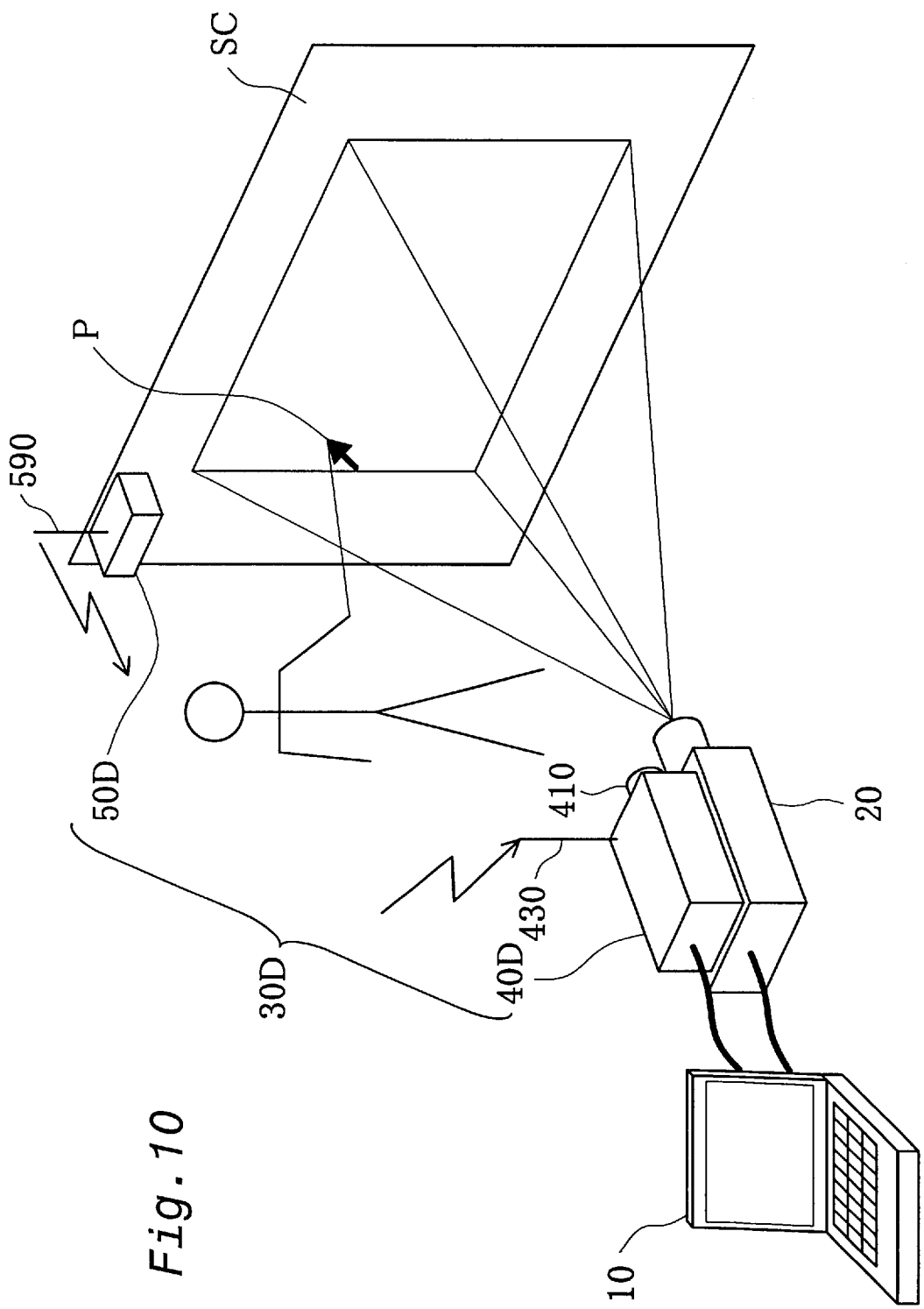
FIG. 10 shows the configuration of a computer system including the pointing device in a third embodiment of the present invention.

C. Third Embodiment:

FIG. 10 shows the configuration of a computer system including the pointing device in a third embodiment of the present invention. The computer system of the third embodiment also has a different configuration in the pointing device 30 of the computer system of the first embodiment shown in FIG. 1, but the configuration for the other components are identical with the first embodiment and therefore will not be explained.

Figure 11:
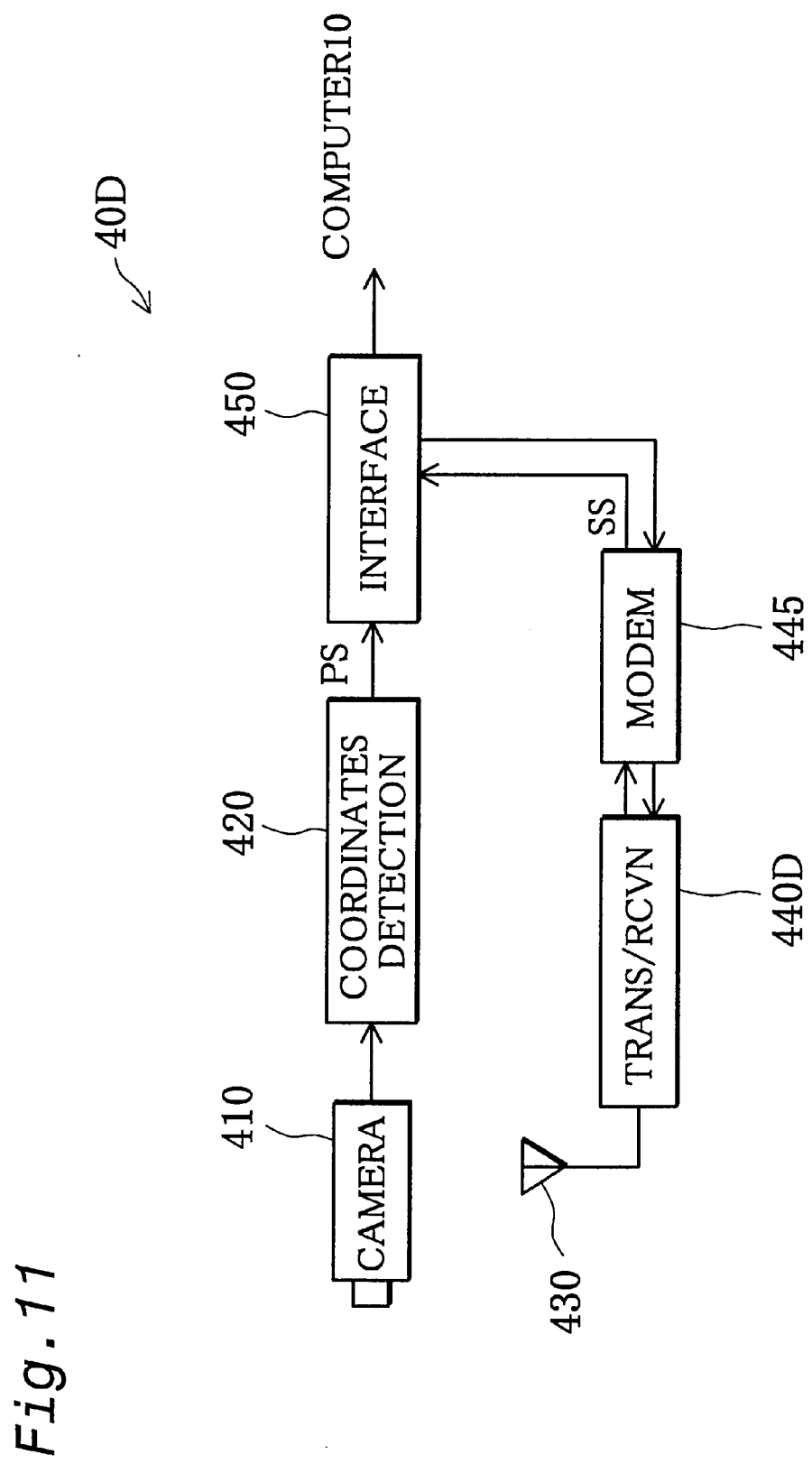
FIG. 11 is a block diagram showing the functional configuration of the pointing device signal generator 40D.
Figure 12:
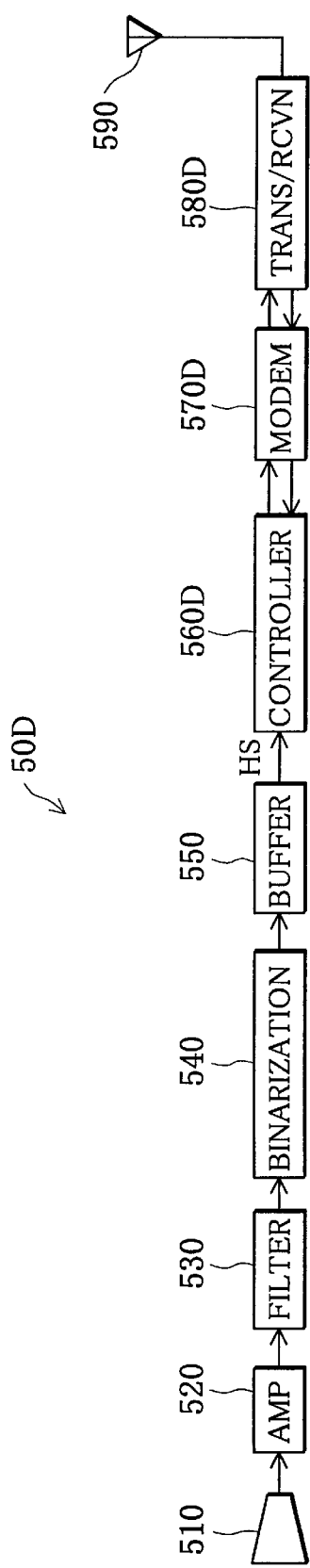
FIG. 12 is a block diagram showing the functional configuration of the tapping sound processor 50D.

The pointing device 30D includes a pointing device signal generator 40D and a tapping sound processor 50D. FIG. 11 shows the functional configuration of the pointing device signal generator 40D. FIG. 12 shows the functional configuration of the tapping sound processor 50D. The pointing device signal generator 40D differs from that in the first embodiment in that the receiver 440 shown in FIG. 2 is replaced with a transmitter/receiver 440D and a modulator/demodulator 445, so that two-way communication may be performed with the tapping sound processor 50. Similarly, the tapping sound processor 50D also differs in that the modulator 570 and the transmitter 580 shown in FIG. 4 are replaced with a modulator/demodulator 570D and a transmitter/receiver 580D, so that two-way communication with the pointing device signal generator 40D may be performed, and in that the control circuit 560 is replaced with a control circuit 560D.

The two-way communication between the tapping sound processor 50D and the pointing device signal generator 40D is carried out based on the transmit/receipt control data supplied from the computer 10 via the interface 450 of the pointing device signal generator 40D. Because the two-way communication may be implemented using various general two-way communication methods such as the half-duplex communication and full duplex communication, explanations will not be given here.

FIGS. 13(a)–13(d), 14(a)–14(d), 15(a)–15(d), 16(a)–16(d), and 17(a)–17(e) are timing charts in regard to the switch signals generated by the control circuit 560D. FIGS. 13(a)–13(d) show how a switch signal SS1 representing a click of the left button of a mouse is generated, and FIGS. 14(a)–14(d) show how a switch signal SS1 representing a double click of the left button of a mouse is generated. FIGS. 15(a)–15(d) show how a switch signal SS2 representing a click of the right button of a mouse, i.e., an escape, is generated. FIGS. 16(a)–16(d) show how a switch signal SS1 representing dragging via the left button of a mouse is generated. FIGS. 17(a)–17(e) show how a hold signal HLD is generated which is used to fix the indicated position on the display screen when a tapping sound is detected.

As shown in FIG. 13(a) when a first tapping sound is detected, a first pulse P1 is generated in the tapping sound detection signal HS. The rise of the first pulse P1 generates a state determination pulse MSK having a pulse width of t5 as shown in FIG. 13(b). Hereinafter, this period t5 is called 'the state determination period'. Where a tapping sound is not detected within this state determination period t5, only one pulse is generated in the first switch signal SS1 as shown in FIG. 13(c). Through this sequence, the detection of a first tapping sound is made to be equivalent to a click of the left mouse button.

Where a second pulse P2 is generated in the tapping sound detection signal HS within the state determination period t5 as shown in FIG. 14(a), two pulses are generated in the first switch signal SS1 as shown in FIG. 14(c). Through this sequence, the detection of two tapping sounds is made to be equivalent to a double click of the left mouse button.

Further, where a third pulse P3 is generated in the tapping sound detection signal HS within the state determination period t5 as shown in FIG. 15(a), one pulse is generated in the second switch signal SS2 as shown in FIG. 15(c). Through this sequence, the detection of three taping sounds is made to be equivalent to a click of the right mouse button, i.e., an escape.

Where a fourth pulse P4 is generated in the tapping sound detection signal HS within the state determination period t5 as shown in FIG. 16(a), the level of the first switch signal SS1 changes from L level to H level and is maintained as H, as shown in FIG. 16(c). Through this sequence, the detection of four tapping sounds is made to be equivalent to dragging by the right mouse button.

The dragging is cancelled when one tapping sound, which corresponds to the first click shown in FIG. 13(a), is detected after the detection of four tapping sounds.

In addition, as shown in FIG. 17(e), a hold signal HLD having a pulse width t7 is generated at the rise of the first pulse P1. Hereinafter, this period t7 is called 'the state fixed period'. This state fixed period t7 starts at the rise of the first pulse P1 and ends at the time when a certain period of time t6 elapses after the fall of the last pulse in the first and second switch signals SS1, SS2. Hereinafter this period t6 is called 'the prohibited period'.

In the state fixed period t7, the indicated position to be used by the computer 10 is fixed. To carry out this fixing, the operation of the coordinates detection circuit 420 (FIG. 11) of the pointing device signal generator 40D is put on hold. Alternatively the output of position data from the interface 450 to the computer 10 may be fixed, or the input of position data may be fixed in the computer 10. Where the input of position data is to be fixed in the computer 10, the hold signal HLD information need to be transmitted to the computer 10.

Use of the hold signal HLD to fix the indicated position on the display screen would resolved the problem that the indicated position moves because the position pointed to by the presenter on the screen slightly changes every time he taps on the screen SC, as explained with reference to the first embodiment.

In addition, during the prohibited period t6, prohibition of transmission of data from the tapping sound processor 50D to the pointing device signal generator 40D is instructed by the computer 10 to the tapping sound processor 50D via the pointing device signal generator 40D. This is carried out by the supply of transmission permitted/prohibited data from the computer 10 to the control circuit 560D via the interface 450D. Actual cessation of transmission takes place by stopping the output from the control circuit 560D or the output from the transmitter/receiver 580D.

As described above, by prohibiting the transmission of data from the tapping sound processor 50D to the computer 10 via the pointing device signal generator 40D for a certain period of time (or prohibited time) t6 after the fall of the last pulse in the first and second switch signal SS1, SS2, an erroneous operation due to noise that occurs during this prohibited period can be reduced.

Because the pointing device signal generator 40D and the tapping sound processor 50D can carryout two-way communication, their operation can be easily adjusted by setting the period t5, t6 and t7 in the control circuit 560D through the communication from the computer 10 via the pointing device signal generator 40D.

The pointing device 30D of this embodiment generates switch data representing mouse operations, that is, a click, double click, escape and dragging, responsive to the number of tapping sounds made by the presenter on the screen SC. Based on this capability, the presenter may easily operate the computer 10 while making a presentation and pointing to the images on the screen SC. Further, in this embodiment, the operation represented by the switch data is determined based on the number of tapping sounds that occur within the state determination period t5, and therefore variations in the intervals of the tapping sounds may be absorbed and the switch data are more stably generated than in the first and second embodiments.

FIG. 18 shows various states of an icon indicating operation of the mouse button. The uppermost state of the icon represents non-selection. When a single click is detected, the icon is filled with a specific color. When a double click is detected, the icon is displayed as a flashing filled icon. Where an escape is detected, property related to the indicated position is displayed. Where dragging is detected, the icon is displayed inverted.

By changing the state of the icon displayed in accordance with the mouse operation, the icon can show the presenter which operation is detected.

The two-way communication may also be adopted in the first and second embodiments. By doing so, the various effects described above may be obtained by the devices of the first and second embodiments.

The screen for a projector is pointed to by a presenter in the above embodiments, but the present invention is also applicable to a case where other types of screen display suitable for various different display devices is directly pointed to by a user.

The input devices of the present invention are embodied as pointing devices in the above embodiments, but the input devices of the present invention may be used as other types of input devices for electronic equipment such as a computer system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pointing device comprising:

a position determination device configured to determine an indicated position on the display screen pointed with a pointing means by a user, to thereby generate a position signal representing the indicated position;

an acoustic input device configured to generate an input operation signal responsive to a sound made by the user, the input operation signal representing operations of a specific input device; and a pointing signal output device configured to supply the pointing signal including the position signal and the input operation signal to a computer, the acoustic input device including:

a tapping sound detector configured to detect a tapping sound made by the user on the display screen to generate a tapping sound detection signal;

a converter configured to convert the tapping sound detection signal into the input operation signal;

an operation signal output device configured to supply the input operation signal to the pointing signal output device, where the input operation signal is transmitted using a transmitter and a receiver, wherein the specific input device is a mouse, and the operations represented by the input operation signal include on/off of a mouse button.

2. A pointing device according to claim 1, wherein
the input operation signal includes a plurality of signal patterns representing a plurality of operations of the mouse button, respectively, and
the converter generates the input operation signal having one of the plurality of signal patterns according to at least one of a frequency and an interval of the tapping sounds.

3. A pointing device according to claim 2, wherein
the plurality of operations of the mouse button include a click, a double click, and dragging, and
the converter generates the input operation signal having one of the signal patterns representing the click, double click, and dragging in response to one, two and three tapping sounds, respectively.

4. A pointing device according to claim 3, wherein when receiving a new tapping sound detection signal after generation of the input operation signal representing the dragging, the converter converts the new tapping sound detection signal into another input operation signal representing end of the dragging.

5. A pointing device according to claim 1, wherein the converter executes:
turning ON the input operation signal when a first tapping sound is detected by the tapping sound detection device;
(a) when a second tapping sound is not detected within a first period of time after the detection of the first tapping sound, turning OFF the input operation signal;
(b) when the second tapping sound is detected within the first period of time, maintaining the input operation signal ON;
(b1) when a third tapping sound is not detected within a second period of time after the detection of the second tapping sound, turning OFF the input operation signal, and then turning ON the input operation signal for a predetermined period of time, and
(b2) when the third tapping sound is detected within the second period of time, maintaining the input operation signal ON, and then turning OFF the input operation signal when a fourth tapping sound is detected.

6. A pointing device according to claim 1, wherein
the input operation signal includes a plurality of signal patterns representing a plurality of operations of the specific input device, respectively, and
the converter generates the input operation signal having one of the plurality of signal patterns responsive to a number of tapping sounds detected within a predetermined period of time after a first tapping sound is detected.

7. A pointing device according to claim 6, wherein
the specific input device is a mouse, and the plurality of signal patterns represent a plurality of operations of the mouse button, respectively.

8. A pointing device according to claim 7, wherein
the plurality of operations of the mouse button include a click, a double click, escape and dragging, and
the converter generates the input operation signal having one of the signal patterns representing the click, double click, escape and dragging in response to zero, one, two and three tapping sounds within the predetermined period of time, respectively.

9. A pointing device according to claim 8, wherein when the converter generates the input operation signal having a signal pattern representing the dragging, the converter further generates the input operation signal having another signal pattern representing end of the dragging when a new tapping sound is detected.

10. A pointing device comprising:
a position determination device configured to determine an indicated position on the display screen pointed with a pointing means by a user, to thereby generate a position signal representing the indicated position;
an acoustic input device configured to generate an input operation signal responsive to a sound made by the user, the input operation signal representing operations of a specific input device,
a pointing signal output device configured to supply the pointing signal including the position signal and the input operation signal to a computer,
the acoustic input device including:
a tapping sound detector configured to detect a tapping sound made by the user on the display screen to generate a tapping sound detection signal;
a converter configured to convert the tapping sound detection signal into the input operation signal;
an operation signal output device configured to supply the input operation signal to the pointing signal output device, where the input operation signal is transmitted using a transmitter and a receiver,
wherein the operation signal output device includes a wireless transmitter.

11. A pointing device according to claim 10, wherein the acoustic input device is located in an ineffective area of the display screen where images are not displayed, and the position determination device is connected to the computer through a cable.

12. A pointing device according to claim 10, wherein the converter executes:
turning ON the input operation signal when a first tapping sound is detected by the tapping sound detection device;
(a) when a second tapping sound is not detected within a first period of time after the detection of the first tapping sound, turning OFF the input operation signal;
(b) when the second tapping sound is detected within the first period of time, maintaining the input operation signal ON;
(b1) when a third tapping sound is not detected within a second period of time after the detection of the second tapping sound, turning OFF the input operation signal, and then turning ON the input operation signal for a predetermined period of time, and
(b2) when the third tapping sound is detected within the second period of time, maintaining the input operation signal ON, and then turning OFF the input operation signal when a fourth tapping sound is detected.

13. A pointing device according to claim 10, wherein
the input operation signal includes a plurality of signal patterns representing a plurality of operations of the specific input device, respectively, and
the converter generates the input operation signal having one of the plurality of signal patterns responsive to a number of tapping sounds detected within a predetermined period of time after a first tapping sound is detected.

14. A pointing device according to claim 13, wherein
the specific input device is a mouse, and the plurality of signal patterns represent a plurality of operations of the mouse button, respectively.

15. A pointing device according to claim 14, wherein the plurality of operations of the mouse button include a click, a double click, escape and dragging, and the converter generates the input operation signal having one of the signal patterns representing the click, double click, escape and dragging in response to zero, one, two and three tapping sounds within the predetermined period of time, respectively.

16. A pointing device according to claim 15, wherein when the converter generates the input operation signal having a signal pattern representing the dragging, the converter further generates the input operation signal having another signal pattern representing end of the dragging when a new tapping sound is detected.

17. A pointing device comprising:

a position determination device configured to determine an indicated position on the display screen pointed with a pointing means by a user, to thereby generate a position signal representing the indicated position;

an acoustic input device configured to generate an input operation signal responsive to a sound made by the user, the input operation signal representing operations of a specific input device; and a pointing signal output device configured to supply the pointing signal including the position signal and the input operation signal to a computer, the acoustic input device including:

a tapping sound detector configured to detect a tapping sound made by the user on the display screen to generate a tapping sound detection signal;

a converter configured to convert the tapping sound detection signal into the input operation signal;

an operation signal output device configured to supply the input operation signal to the pointing signal output device, where the input operation signal is transmitted using a transmitter and a receiver, wherein the position determining device includes:

a camera configured to capture an image of an effective screen area of the display screen where images are to be displayed; and a position detector configured to detect the indicated position based on the image captured by the camera.

18. A pointing device according to claim 17, wherein the converter executes:

turning ON the input operation signal when a first tapping sound is detected by the tapping sound detection device;

(a) when a second tapping sound is not detected within a first period of time after the detection of the first tapping sound, turning OFF the input operation signal;

(b) when the second tapping sound is detected within the first period of time, maintaining the input operation signal ON;

(b1) when a third tapping sound is not detected within a second period of time after the detection of the second tapping sound, turning OFF the input operation signal, and then turning ON the input operation signal for a predetermined period of time, and (b2) when the third tapping sound is detected within the second period of time, maintaining the input operation signal ON, and then turning OFF the input operation signal when a fourth tapping sound is detected.

19. A pointing device according to claim 17, wherein the input operation signal includes a plurality of signal patterns representing a plurality of operations of the specific input device, respectively, and the converter generates the input operation signal having one of the plurality of signal patterns responsive to a number of tapping sounds detected within a predetermined period of time after a first tapping sound is detected.

20. A pointing device according to claim 19, wherein the specific input device is a mouse, and the plurality of signal patterns represent a plurality of operations of the mouse button, respectively.

21. A pointing device according to claim 20, wherein the plurality of operations of the mouse button include a click, a double click, escape and dragging, and the converter generates the input operation signal having one of the signal patterns representing the click, double click, escape and dragging in response to zero, one, two and three tapping sounds within the predetermined period of time, respectively.

22. A pointing device according to claim 21, wherein when the converter generates the input operation signal having a signal pattern representing the dragging, the converter further generates the input operation signal having another signal pattern representing end of the dragging when a new tapping sound is detected.

* * * * *